United States Patent
Sabet et al.

(10) Patent No.: US 9,806,970 B2
(45) Date of Patent: Oct. 31, 2017

(54) IP ADDRESS CONFLICT RESOLUTION SYSTEM AND METHOD

(71) Applicant: Crestron Electronics, Inc., Rockleigh, NJ (US)

(72) Inventors: Sameh Sabet, Freehold, NJ (US); Pranav Bhargava, Monroe Township, NJ (US); Toine Leerentveld, Keyport, NJ (US); William McGuire, Ridgewood, NJ (US)

(73) Assignee: CRESTRON ELECTRONICS, INC., Rockleigh, NJ (US)

( * ) Notice: Subject to any disclaimer, the term of this patent is extended or adjusted under 35 U.S.C. 154(b) by 247 days.

(21) Appl. No.: 14/615,634

(22) Filed: Feb. 6, 2015

(65) Prior Publication Data

US 2016/0234162 A1   Aug. 11, 2016

(51) Int. Cl.
G06F 15/16 (2006.01)
H04L 12/26 (2006.01)
H04L 12/24 (2006.01)
H04L 29/12 (2006.01)

(52) U.S. Cl.
CPC .......... H04L 43/08 (2013.01); H04L 41/0806 (2013.01); H04L 41/0873 (2013.01); H04L 41/12 (2013.01); H04L 61/2015 (2013.01); H04L 61/2046 (2013.01)

(58) Field of Classification Search
USPC ......................................... 709/227, 228, 245
See application file for complete search history.

(56) References Cited

U.S. PATENT DOCUMENTS

| | | | |
|---|---|---|---|
| 6,295,298 B1 * | 9/2001 | Hrastar | H04L 29/12283 370/409 |
| 8,606,940 B2 | 12/2013 | Dighe et al. | |
| 2009/0040964 A1 * | 2/2009 | Zhao | H04L 29/12311 370/328 |

FOREIGN PATENT DOCUMENTS

CA      2308261 A1    11/2001

OTHER PUBLICATIONS

"Dynamic Host Configuration Protocol," May 26, 2014, Wikopedia, http://en.wikipedia.org/wiki/dynamic_host_configuration_protocol, 20 pages.

(Continued)

*Primary Examiner* — Lan-Dai T Truong
(74) *Attorney, Agent, or Firm* — Crestron Electronics, Inc

(57) ABSTRACT

A method for assigning new internet protocol (IP) addresses to new devices in an existing network is provided comprising assigning respective new IP addresses to one or more new network components by a first device based on one or more communications received by the first device, wherein the one or more communications comprise advertisement messages that include information about the one or more new network components. A network system is further provided, the network system comprising a first device adapted to assign respective new internet protocol (IP) addresses to one or more new network components based on one or more communications received by the first device, wherein the one or more communications comprise advertisement messages that include information about the one or more new network components.

21 Claims, 7 Drawing Sheets

(56) References Cited

OTHER PUBLICATIONS

"Floodless in Seattle: A Scalable Ethernet Architecture for Large Enterprises," Changhoon Kim, et al., Sigcomm '08, Aug. 17-22, 2008, Seattle, Washington, 14 pages.
"VLAN Aggregation for Efficient IP Address Allocation," Feb. 2001, McPherson, D., et al., The Internet Society (2001), 7 pages.

\* cited by examiner

IP ADDRESS CONFLICT RESOLUTION SYSTEM AND METHOD

BACKGROUND OF THE INVENTION

Technical Field

Aspects of the embodiments relate to systems, methods, and modes for preventing internet protocol (IP) address conflicts when installing or integrating new networks with existing networks.

Background Art

FIG. 1 illustrates a basic network for use in either a commercial or residential system. Existing network (EN) 100 shown in FIG. 1 includes EN server 102, cabling/wiring/wireless connections 103, and network devices 104. As those of skill in the art can appreciate, EN 100 can take the form of one of many different topologies of networks, as described in greater detail below in regard to FIG. 2. As those of skill in the art can further appreciate, EN 100 can actually be more than one network, as it can be a conglomeration of two, three, or even more sub-networks, especially when used in commercial environments that might have different security concerns and/or network operating parameters than in the residential environment. What is typically fairly important, however, is that whenever new networks are added to EN 100, little to no disruption should take place as the new devices are brought "on-line." That is, when a new network 100b is added to EN 100, the devices and servers of new network 100b should minimally, if at all, impact the users/devices of EN 100. One example of a new sub-network might be the installation of a new sub-network for use in providing automation control of lighting, shades, draperies, environmental and other related devices.

Referring now to FIG. 2, which illustrates various conventional computer data network topologies that may be suitable for use as commercial and/or residential networks, several different network topologies will be discussed. As those of skill in the art can appreciate, any one of the networks shown and discussed below in regard to FIG. 2 can be incorporated as an existing network 100, or, as described further below, as new network 300.

In bus network topology 202, each node 206 is connected to a single bus 208. A signal from bus root node 204 travels to all nodes connected on single bus 208 until it finds the intended recipient node 206. In all the network topologies shown in FIG. 2, the central, source, or hub node, is shown as an octagon, and the attached nodes (which generally represent computers, printers, scanners and other electronic devices, or in the case of a home automation system, microcontrollers), are shown as empty circles. In bus network topology 202, if the intended recipient address, for a particular data packet, does not match any address of a node 206 connected to bus 208, then that data packet is ignored. Alternatively, if the intended recipient address matches the address of a node 206 connected to bus 208, then that data packet is accepted at that node 206. Since bus topology 202 consists of only one bus 208, it is rather inexpensive to implement when compared to other network topologies. However, the low cost of implementing the technology is offset by the high cost of managing bus network topology 202. Such cost is partially related to the cost of adding other nodes (or computers) 206, which includes running bus 208 to the new node 206 and/or a bus-feed to the existing main bus 208. Additionally, since only one cable is utilized for bus 208, it can also be a single point of failure that takes down the entire network, or a good portion of it, depending on where it fails. In terms of home (or commercial) automation systems, additional limitations can include that only a limited amount of power can be transferred to devices on bus network topology 202 from bus root node 204. If additional nodes 206 are added that require additional power, a new power supply could be required, but there is a limit as to how much power can be transferred over conventional cabling for bus network topology 202. This is especially true in the case of microcontrollers that control systems that might be remotely located from conventional power source (i.e., home/building 120 VAC or 220 VAC "house" power).

In local area networks where star network topology (star network) 210 is used, each node 206 is connected to star center node 212 with a point-to-point connection. Star network 210 does not necessarily have to resemble a star to be classified as a star network, but all of the nodes 206 on star network 210 must be connected to start center node 212. All traffic that traverses star network 210 passes through star center node 212, and as such, star center node 212 acts as a signal repeater. The star topology is considered the easiest topology to design and implement. An advantage of star network 210 is the simplicity of adding additional nodes 206. The primary disadvantage of star network 210 is that star center node 212 represents a single point of failure; if it fails, no communications can take place (whereas in bus network 202, non-source nodes 206 can take over as bus root node 204). In terms of automation systems, star network 210 can transfer larger amounts of power, because each interconnecting cable only has to handle the power that its end node requires (i.e., one cable does not carry all of the current for the entire network), although a new power supply (at star center node 212) at some point might be required. However, each time a new node 206 is added, the cable must be "home-runned" back to star center node 212, which can be costly. Note that in both bus network 202 and star network 210, each node has been designated 206; that is because the nodes in both bus network 202 and star network 210 are essentially interchangeable, and do not materially add to the functionality of their respective networks (i.e., in essence, absent failure, they each essentially only receive their own data, and transmit their own data; this is not the case with the remaining network topologies, discussed in greater detail below).

Another local area network is daisy-chain network topology (daisy-chain network) 214. In daisy-chain network 214, it is fairly easy and straightforward to add more computers or nodes 218 into the network by daisy-chaining, or connecting each computer/node 218 in series to the next. If a message is intended for a node 218n partway down the line, each node 218 bounces it along in sequence until it reaches its destination. Daisy chain network 214 can take two basic forms: linear and ring. In terms of automation systems, daisy chain network 214 is also problematic in terms of power because all of the power needs to be transferred through one cable, similarly to bus network 202; thus, there are practical limitations as to the number of devices/nodes 218 that can be attached and/or the total power that can be provided. If additional power is required in nodes 218 further down the line in the daisy chain, then local transformers or other power supplies could be necessary to provide the additional power. Daisy chain nodes 218 are also different from nodes 206 in bus network 202 and start network 210 in that daisy chain nodes 218 not only receive data/commands that do not pertain to them, but those same data/commands must be transported down the line until it reaches its proper daisy chain destination node 218.

A linear topology in a daisy chain network 214 puts a two-way link between a first daisy chain node 218a and a second daisy chain node 218b. By connecting, for example, daisy chain node 218n with daisy root node 216, a ring topology can be formed. An advantage of the ring topology is that the number of transmitters and receivers can be cut in half, since a message will eventually loop all of the way around (i.e., the message need only be sent in only one direction). When a first daisy chain node 218a sends a message, the message is processed by each daisy chain node 218 in the ring that follows the first daisy chain node 218a. If the ring breaks at a particular link then the transmission can be sent via the reverse path thereby ensuring that all nodes are always connected in the case of a single failure (in this case, however, each daisy chain node 218 would have to have both a transmitter and receiver in each direction).

Tree network topology (tree network) 220 is also shown in FIG. 2. The topology of tree network 220 is based on a hierarchy of nodes. The highest level of any tree network consists of a single, or tree root node 222 (i.e., the octagon of tree network 220). Tree root node 222 is connected either to a single (or, more commonly, multiple) first level node(s) 224 in the level below by point-to-point links (note that tree root node 222 is connected first to first lower level node 224a, and then first lower level node 224a is connected to first lower level node 224b, and so on). These first lower level nodes 224 are also connected to a single or multiple second lower level nodes 226 in the next level down. Tree networks 220 are not constrained to any number of levels, but as tree networks 220 are a variant of bus network 202 topology, they are prone to crippling network failures should a connection in a higher level of nodes fail/suffer damage (i.e., if first lower level node 224a failed, everything would essentially fail as root node 222 is then cut off from all of the other nodes). Each node in the network has a specific, fixed number of nodes connected to it at the next lower level in the hierarchy ("lower" referring to levels away from root node 222; the first lower level including first lower level nodes 224, the next lower level including second lower level nodes 226, and so on), this number being referred to as the 'branching factor' of the tree.

While tree networks 220 are capable in terms of data throughput, in terms of power distribution tree networks 220 suffer from the same limitations as bus network 202 and daisy chain network 214 in that all of the power must be transferred by the first cable from the central node; further, because of the nature of the "tree" like growth, there is no way of knowing in advance how much power each branch might ultimately have to transfer. If additional power is required in nodes further down the branches of the "tree," then local transformers or other power supplies could be necessary to provide the additional power.

The last network topology to be discussed in regard to FIG. 2 is mesh network 228, which is a network topology in which each node (called a mesh level node 232) relays data for the entire network. All nodes cooperate in the distribution of data in mesh network 228. Mesh network 228 typically has a self-healing capability that enables data rerouting when one node breaks down or a connection goes bad. As a result, mesh network 228 is typically quite "robust" or reliable, as there is often more than one path between a source and a destination in mesh network 228. Although mostly used in wireless situations (shown as dashed lines), the "mesh network" concept is also applicable to wired networks (solid lines) and software interaction. Mesh networks 228 are applicable to data only, as power cannot be effectively be transferred wirelessly.

Mesh networks 228 can be implemented with either a flooding technique or a routing technique to transmit messages. When using a routing technique, the message is propagated along a path, by hopping from one mesh level node 232 to the next mesh level node 232 until the destination is reached (e.g., first mesh level node 232a to second mesh level node 232b, and so on). To ensure the availability of all of its paths, a routing network must allow for continuous connections and reconfiguration around broken or blocked paths using self-healing algorithms. A flooding technique is one in which the message is transmitted to all of the mesh level nodes of mesh network 228 (e.g., the transmission is sent to first mesh level node 232a, second mesh level node 232b, and third mesh level node 232c, and then from each of them, the message is sent to other mesh nodes that are respectively in communication with the mesh nodes 232a-c that received the message). The attractiveness of the flooding technology lies in its high reliability and simplicity. As those of skill in the art can appreciate, there is no need for sophisticated routing techniques since there is no routing. No routing means no network management, no need for self-discovery, no need for self-repair, and, because the message is the payload, no overhead for conveying routing tables or routing information.

A mesh network 228 whose nodes 230, 232 are all connected to each other is a fully connected network. A fully connected network can be costly, as either a wired connection is required between each node (or computer) or a wireless interface needs to be installed. Of course, the wireless interface can save wiring costs, but can also prove to be less reliable (and slower) under some conditions, as those of skill in the art can appreciate.

As discussed above, however, each of network topologies 202, 210, 214, 220, and 228 still suffer from the problems discussed above with respect to FIG. 1 in that if a first network is later joined by a second network, and then a third, and so on, IP address conflicts can occur and can cause problems within the entire system of interconnected networks. Thus, there is a need for a network integration system and method in order to provide substantially seamless integration whenever one or more new networks are added to one or more existing networks.

SUMMARY OF THE INVENTION

It is to be understood that both the general and detailed descriptions that follow are explanatory only and are not restrictive of the embodiments.

According to a first aspect of the embodiments, a method is provided for assigning new internet protocol (IP) addresses to new devices in an existing network, the method comprising: assigning respective new IP addresses to one or more new network components by a first device based on one or more communications received by the first device, wherein the one or more communications comprise advertisement messages that include information about the one or more new network components. According to the first aspect of the embodiments, the advertisement comprises a message received from a device that uses either or both of router internet protocol (RIP) and open shortest path first protocol (OSPF) messages to publish information regarding the one or more new network components being added to the existing network.

According to the first aspect of the embodiments, the one or more new network components comprise one or more of a router, server, printer, computer, a facsimile machine, a scanner, network switch and any other network compatible device, and further wherein the first device comprises a router.

According to the first aspect of the embodiments, the step of assigning comprises determining (602) an existing set of IP addresses for existing network devices; and assigning respective previously un-assigned IP addresses to the one or more new network components. According to the first aspect of the embodiments, the step of assigning respective previously un-assigned IP addresses comprises determining if there are any conflicts between IP addresses of existing devices of the existing network and IP addresses of the new devices; and resolving conflicts between the existing IP addresses and new IP addresses in favor of the existing IP addresses and assigning previously un-assigned IP addresses to the new IP devices.

Still further according to the first aspect of the embodiments, the step of assigning of assigning respective previously un-assigned IP addresses comprises determining if there are any conflicts between IP addresses of existing devices of the existing network and IP addresses of the new devices; determining a priority level of each of the existing devices according to a multi-tiered prioritization scale; determining a priority level of each of the new devices according to a multi-tiered prioritization scale; and resolving conflicts between conflicting IP addresses based on the prioritization scale, such that higher prioritization ranked devices retain their IP addresses over lower prioritization devices. According to the first aspect of the embodiments, the steps of the method according to the first aspect are performed substantially continuously so that new devices and their respective addresses can be detected and resolved substantially continuously.

According to a second aspect of the embodiments, a method for assigning new IP addresses to new devices in an existing network is provided, the method comprising (a) determining (602) an existing set of IP addresses for existing network devices, (b) determining (602) which of the existing set of IP addresses are designated with a high-priority IP address designation and which are designated with a low-priority IP address designation, (c) connecting (604) one or more new devices to the existing network, (d) determining (606) a new set of IP addresses for one or more new devices connected to the existing network, (e) determining (608) which of the new set of IP addresses are designated with a high-priority IP address designation and which are designated with a low-priority IP address designation, (f) comparing (610) new high-priority IP addresses with existing high-priority IP addresses and re-assigning IP addresses of the new devices with the high-priority IP address designation if there is a conflict, and creating a new high-priority IP address list, (g) comparing (612) new low-priority IP addresses with both existing low-priority IP addresses and high-priority IP address list, and re-assigning IP addresses of the new devices with the low-priority IP address designation if there is a conflict, and (h) continuing (614, 616) to monitor the network for new devices, and repeating the steps of (d) through (g) whenever new devices are added to the network.

According to a third aspect of the embodiments, a network system is provided comprising a first device adapted to assign respective new internet protocol (IP) addresses to one or more new network components based on one or more communications received by the first device, wherein the one or more communications comprise advertisement messages that include information about the one or more new network components. According to the third aspect of the embodiments, the advertisement comprises a message received from a device that uses either or both of router internet protocol (RIP) and open shortest path first protocol (OSFP) messages to publish information regarding the one or more new network components being added to the existing network. According to the third aspect of the embodiments, one or more new network components comprise one or more of a router, server, printer, computer, a facsimile machine, a scanner, network switch and any other network compatible device.

According to the third aspect of the embodiments, the first device comprises a router, and the first device is further adapted to determine an existing set of IP addresses for existing network devices, and to assign respective previously un-assigned IP addresses to the one or more new network components. Still further according to the third aspect of the embodiments, the first device is further adapted to determine if there are any conflicts between IP addresses of existing devices of the existing network and IP addresses of the new devices, and to resolve conflicts between the existing IP addresses and new IP addresses in favor of the existing IP addresses and assigning previously un-assigned IP addresses to the new IP devices.

According to the third aspect of the embodiments, the first device is further adapted to determine if there are any conflicts between IP addresses of existing devices of the existing network and IP addresses of the new devices, to further determine a priority level of each of the existing devices according to a multi-tiered prioritization scale, to further determine a priority level of each of the new devices according to a multi-tiered prioritization scale, and to still further resolve conflicts between conflicting IP addresses based on the prioritization scale, such that higher prioritization ranked devices retain their IP addresses over lower prioritization devices.

According to the third aspect of the embodiments, the first device is further adapted to resolve conflicts substantially continuously so that new devices and their respective addresses can be detected and resolved substantially continuously.

DISCLOSURE OF INVENTION

The aspects of the embodiments described herein seek to overcome or at least ameliorate one or more of several problems, including but not limited to conflicts in addresses when using an internet protocol means for addressing devices when new devices and networks are added to one or more existing networks.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1:
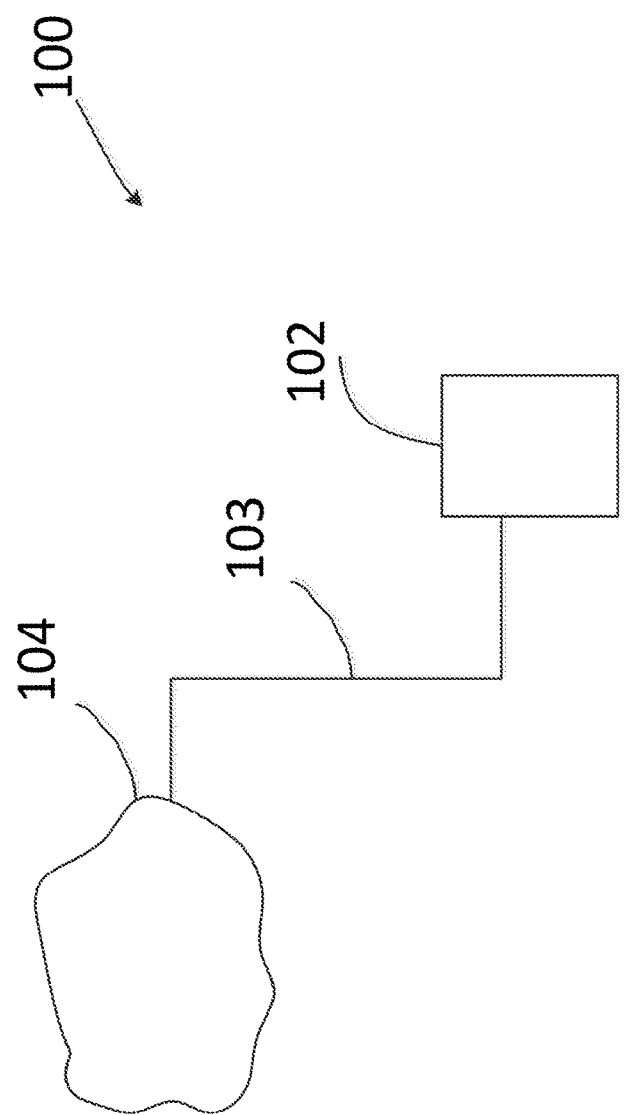

FIG. 1 illustrates an existing network for an entity.

Figure 2:
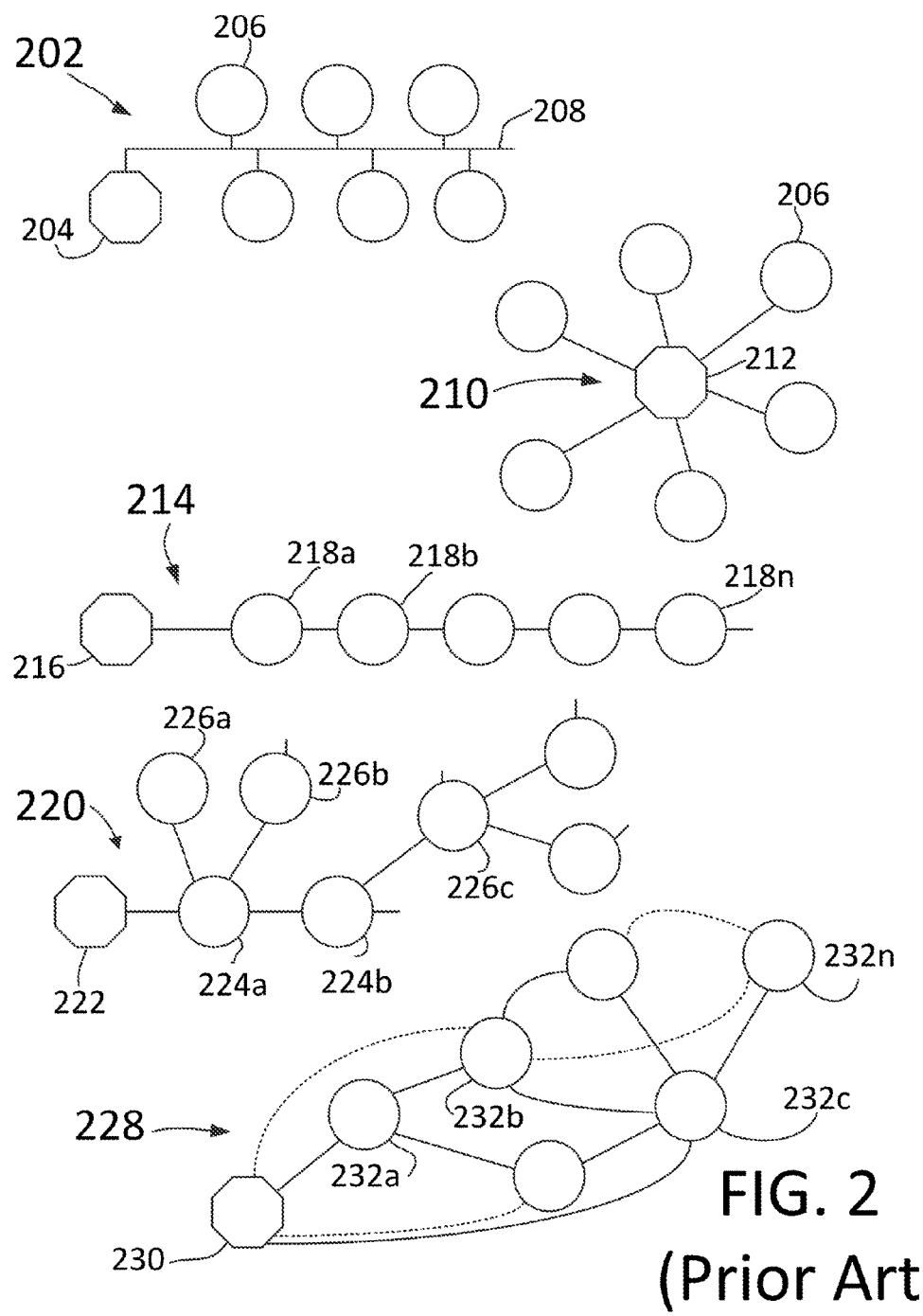

FIG. 2 illustrates various conventional computer data network topologies that may be suitable for use as commercial and/or residential networks.

Figure 3:
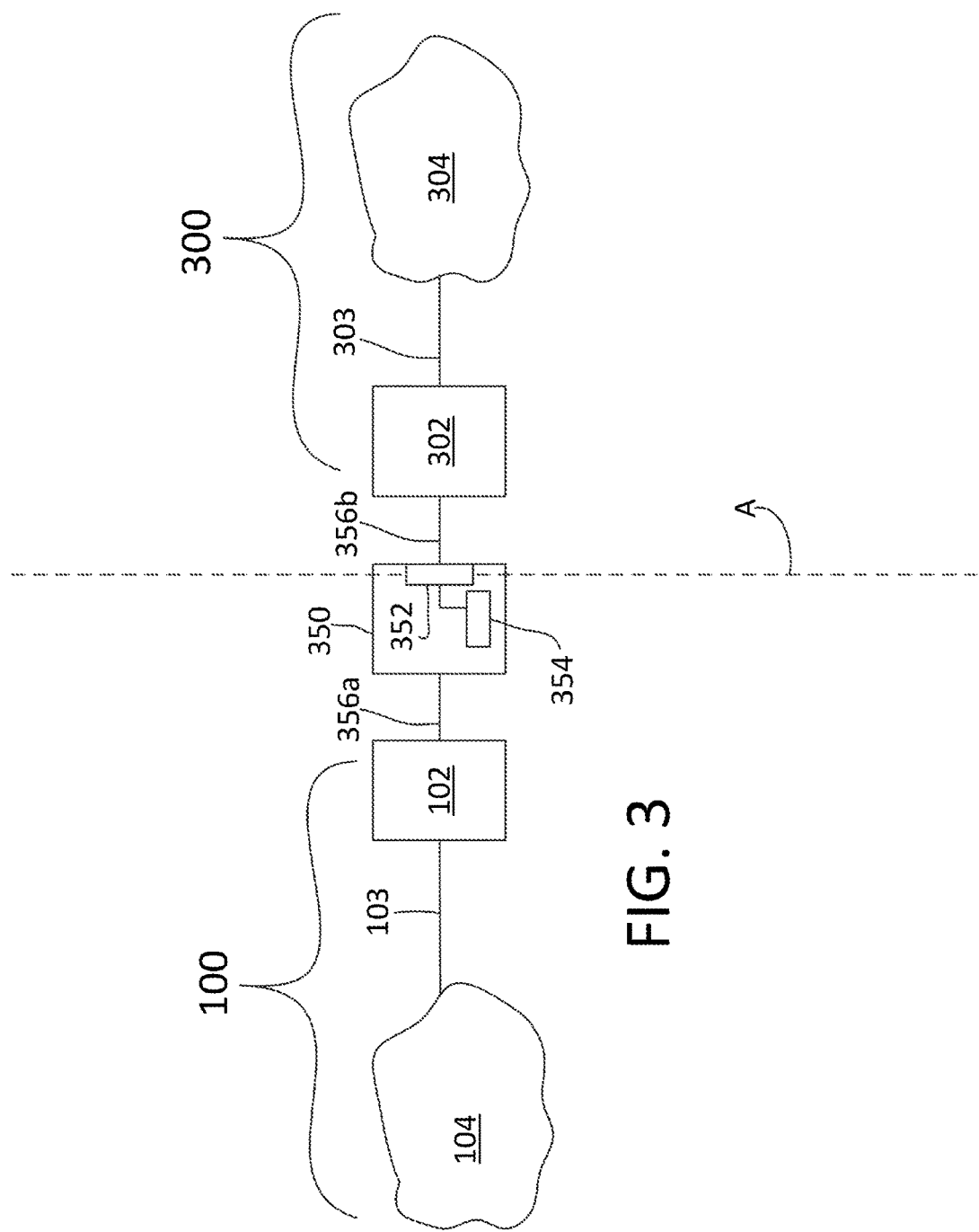

FIG. 3 illustrates a network interconnection server to dynamically assign addresses to all new devices that are part of a new network not in conflict with any addresses of existing devices that are part of an existing network according to an embodiment.

Figure 4:
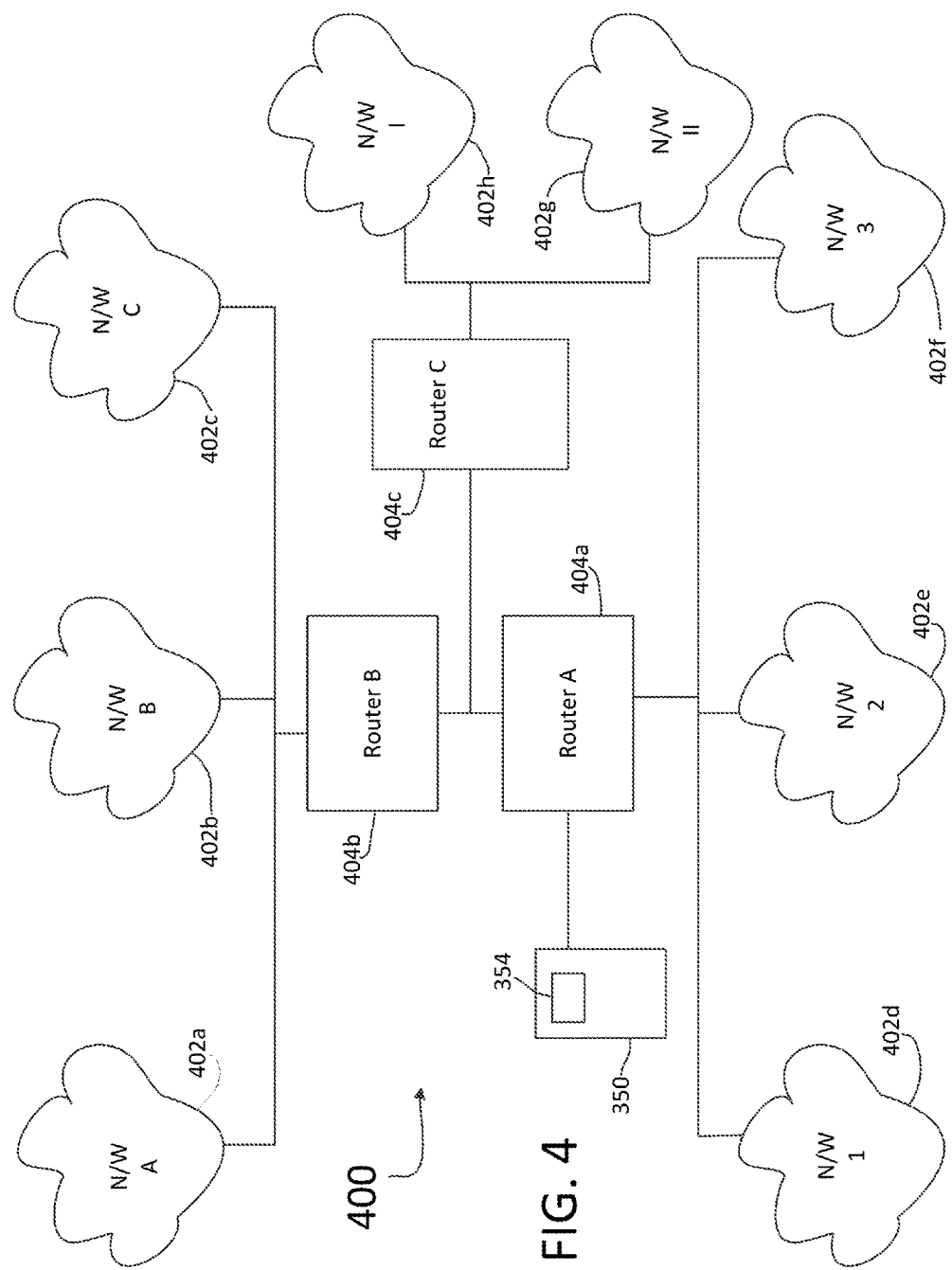

FIG. 4 illustrates a network that can use router information protocol (RIP) messages or open shortest path first protocol (OSPF) messages to determine when new networks and/or devices are being added to an existing network, wherein each of the RIP and OSPF messages can contain information about new networks with new IP addresses being connected or attached to the existing network(s), and can further contain information about new devices with new IP addresses being connected or attached to the existing network(s).

Figure 5:
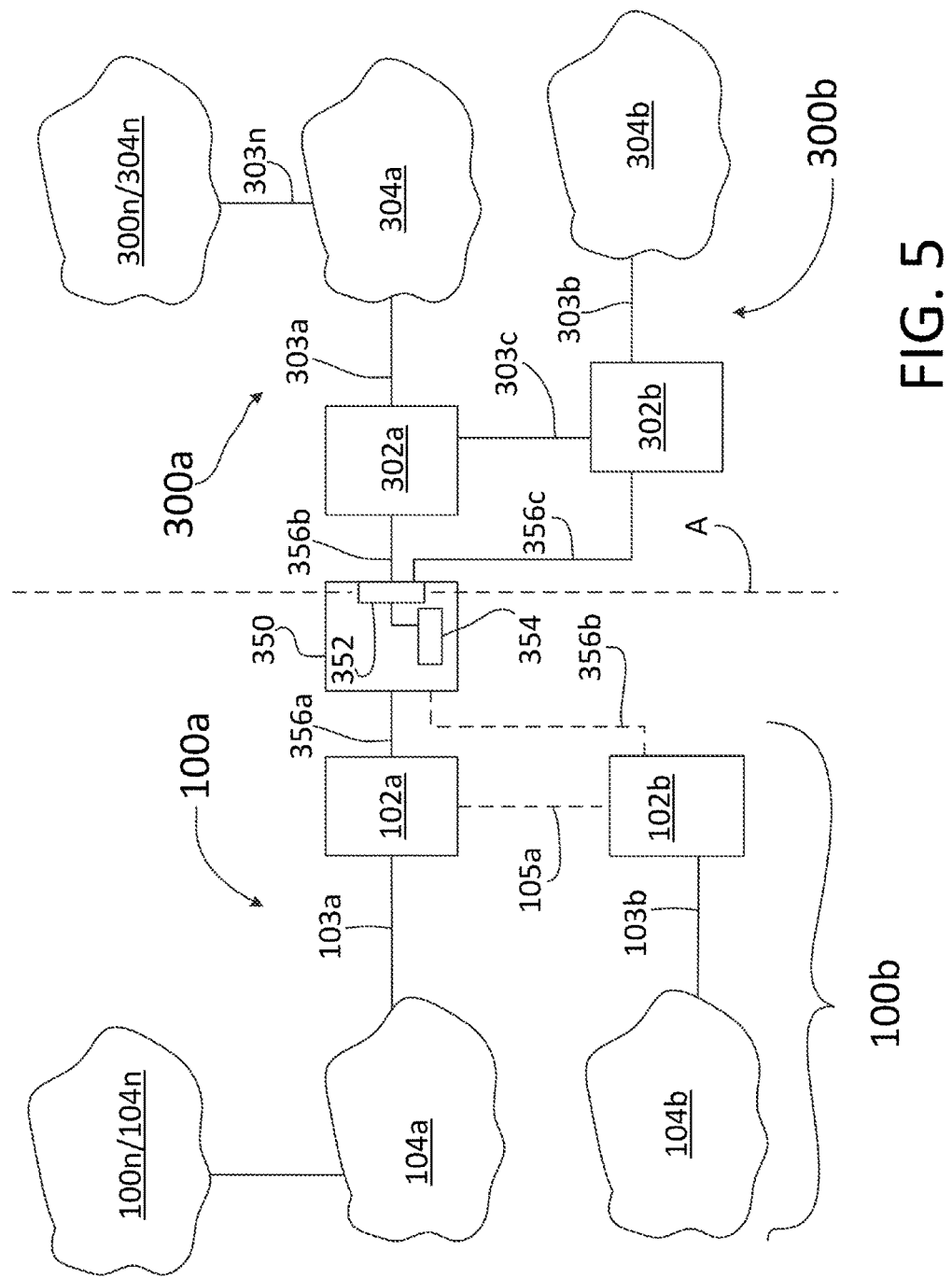

FIG. 5 illustrates the network interconnection server shown in FIG. 3 according to a further embodiment that can further dynamically assign address to new networks and their new devices regardless of where the new network and its respective devices have been added to the existing network according to an embodiment.

Figure 6:
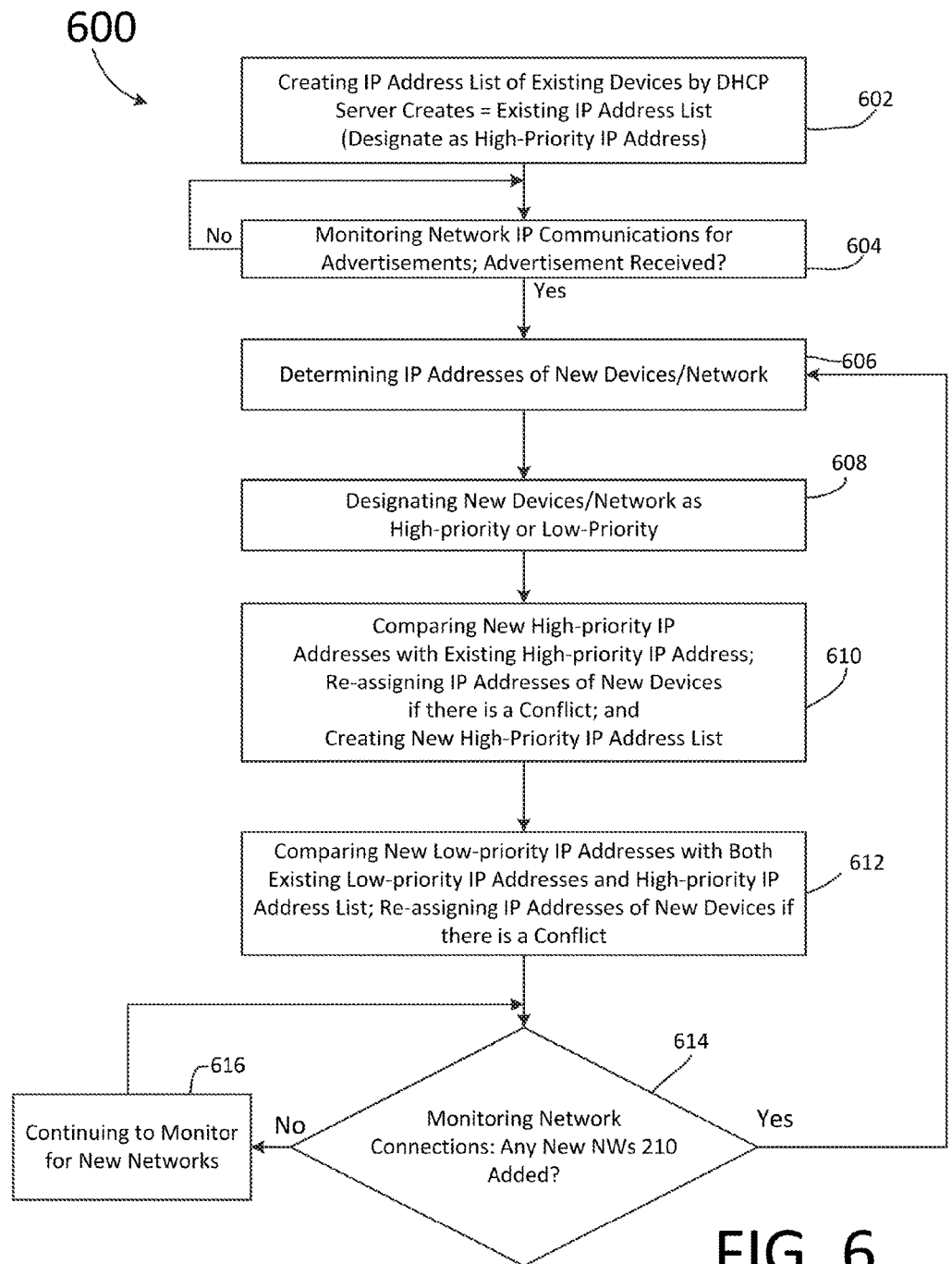

FIG. 6 illustrates a flow chart of a method for integrating new networks and respective devices with one or more existing networks according to an embodiment.

Figure 7:
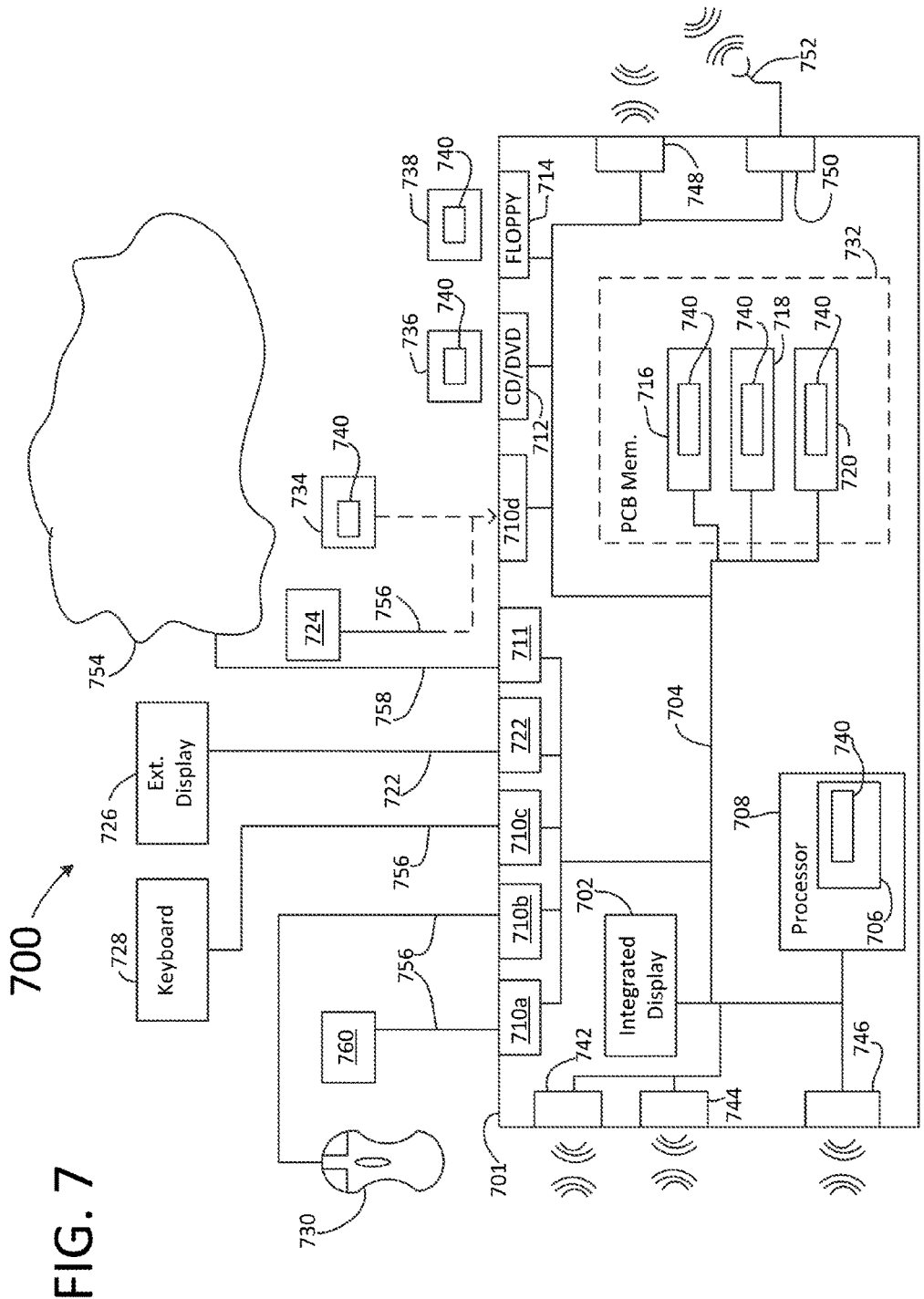

FIG. 7 illustrates a PC/laptop/Server (herein after, "server") suitable for use to implement the method shown in FIG. 6 according to an embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as motorized roller shades.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

MODE(S) FOR CARRYING OUT THE INVENTION

The different aspects of the embodiments described herein pertain to the context of a commercial network system, but is not limited thereto, except as may be set forth expressly in the appended claims.

The following is a list of the major elements in the drawings in numerical order.

100 Existing Network (corporation, home, school, other entity)
102 Existing Network Server/Root Node
103 Existing Network Wired/Wireless Interconnection(s)
104 Existing Network Devices
202 Bus Network Topology
204 Bus Root Node
206 Node
208 Single Cable
210 Star Network Topology
212 Star Center Node
214 Daisy-chain Network Topology
216 Daisy Root Node
218 Daisy-chain Node
220 Tree Network Topology
222 Tree Root node
224 First Level Node
226 Second Level Node
228 Mesh Network Topology
230 Mesh Root Node
232 Mesh Level Node(s)
300 New Network
302 New Network Server/Root Node
303 New Network Wired/Wireless Interconnection(s)
304 New Network Devices
350 Dynamic Host Control Protocol (DHCP) Server
352 Router
354 Dynamic IP Address Control/DHCP Firmware
356 Dynamic Host Control Protocol (DHCP) Server Wired/Wireless Interconnection(s)
700 Personal Computer/Laptop/Tablet/Personal Electronic Device (PED)/Server (PC)
701 Shell/Box
702 Integrated Display/Touch-Screen (laptop/tablet etc.)
704 Internal Data/Command Bus (Bus)
706 Processor Internal Memory
708 Processor(s)
710 Universal Serial Bus (USB) Port
711 Ethernet Port
712 Compact Disk (CD)/Digital Video Disk (DVD) Read/Write (RW) (CD/DVD/RW) Drive
714 Floppy Diskette Drive
716 Hard Disk Drive (HDD)
718 Read-Only Memory (ROM)
720 Random Access Memory (RAM)
722 Video Graphics Array (VGA) Port or High Definition Multimedia Interface (HDMI)
724 External Memory Storage Device
726 External Display/Touch-Screen
728 Keyboard
730 Mouse
732 Processor Board/PC Internal Memory (Internal Memory)
734 Flash Drive Memory
736 CD/DVD Diskettes 738 Floppy Diskettes
740 Executable Software Programming Code/Application (Application, or "App")
742 Wi-Fi Transceiver
744 BlueTooth (BT) Transceiver
746 Near Field Communications (NFC) Transceiver
748 Third Generation (3G), Fourth Generation (4G), Long Term Evolution (LTE) (3G/4G/LTE) Transceiver
750 Communications Satellite/Global Positioning System (Satellite) Transceiver Device
752 Antenna
754 Internet
756 Universal Serial Bus (USB) Cable
758 Ethernet Cable (CAT5)
760 Scanner/Printer/Fax Machine The following is a list of acronyms used in the specification in alphabetical order.

3G/4G Third Generation/Fourth Generation
App Application/Program/Software
AV Audio Video
BT Bluetooth
CD Compact Disk
CIDR Classless Inter-Domain Routing
DAC Dynamic Address Control
DHCP Dynamic Host Configuration Protocol
DVD Digital Video Disk
EN Existing Network
FD Flash Drive
HDD Hard Disk Drive
HDMI High Definition Multimedia Interface
IP Internet Protocol
LTE Long Term Evolution
N/W Network
NFC Near Field Communication
OSPF Open Shortest Path First Protocol
PC Personal Computer
PED Personal Electronic Device
RAM Random Access Memory
RIP Router Information Protocol
ROM Read Only Memory
RW Read/Write
SAC Static Address Control
USB Universal Serial Bus
VGA Video Graphic Array FIG. 3 illustrates dynamic host control protocol (DHCP) server 350 configured to dynamically assign new addresses to all new devices that are part of new network 300 such that no new addresses are in conflict with any existing addresses of existing devices 104 that are part of existing network 100 according to an embodiment.

According to an embodiment, DHCP server 350 shields all of the devices 304 that comprise new network 300 from EN 100. As shown in FIG. 3, EN 100 includes existing network devices 104, connected to existing network server 102 by EN wired/wireless interconnections 103. EN server 102 is connected to DHCP server 350 via dynamic host protocol server wired/wireless interconnections 356a. Further, new network 300 includes new network devices 304, connected to new network server 302 by new network wired/wireless interconnections 303. New network server 302 is connected to DHCP server 350 via dynamic host protocol server wired/wireless interconnections 356b According to a further embodiment, new network devices 304 can be building/home control devices—such as lighting control devices, shade control devices, environmental (temperature/heating) control devices, room access control devices, drapery control devices, audio/video (AV) control devices, safety and security control devices (fire, smoke, carbon monoxide, intrusion alert devices), among other types of home/enterprise devices/systems.

According to a further embodiment, DHCP server 350 includes router 352, such as an Ethernet router, that can detect existing IP addresses of existing network devices 104 that comprises EN 100, as well as the predetermined, or preset IP addresses of new network devices 304. Detection of the entire set of IP addresses, that is, of EN 100 and new network 300, can be performed through dynamic IP address manager/DHCP firmware (new network detection firmware) 354 located within memory of DHCP server 350. According to a further embodiment, such new network detection firmware 354 can include dynamic host configuration protocol (DHCP) functionality, as its name implies. According to further aspects of the embodiments, such detection of new network 300 and its associated devices can occur through a substantially continuous "sniffing" or "seeking" function, wherein new network detection firmware 354 listens for or detects the presence of router information protocol (RIP) messages or open shortest path first (OSPF) protocol messages. Each of said RIP and OSPF messages can contain information about new networks with new IP addresses being connected or attached to the existing network(s), or can further contain information about new devices with new IP addresses being connected or attached to the existing network(s).

As those of skill in the art can appreciate, RIP and OSPF are protocols that include the function of transmitting messages that routers exchange in order for the routers to find out what networks are connected on other routers. Referring now to FIG. 4, a first set of networks A, B, and C 402a-c, can have Router B 404b connected thereto. Each of networks A, B, and C 402a-c has a different network address associated therewith. Router A 404a is affiliated with networks 1, 2, and 3 402d-f. Router A 404a can use messages transmitted by Router B using RIP and OSPF protocols to obtain a table or list of the addresses of networks A, B, and C 402a-c so that Router A 404a can get a message to Router B 404b and to the correct node.

OSPF is an interior gateway protocol (IGP) for routing internet protocol (IP) packets solely within a single routing domain, such as an autonomous system. It gathers link state information from available routers and constructs a topology map of the network. The topology is presented as a routing table to the internet layer that routes datagrams based solely on the destination IP address found in IP packets. OSPF supports IP version 4 (IPv4) and IP version 6 (IPv6) networks and features variable-length subnet masking (VLSM) and Classless Inter-Domain Routing (CIDR) addressing models.

OSPF detects changes in the topology, such as link failures, and converges on a new loop-free routing structure within seconds. It computes the shortest path tree for each route using a method based on Dijkstra's algorithm, a shortest path first algorithm. The OSPF routing policies for constructing a route table are governed by link cost factors (external metrics) associated with each routing interface. Cost factors can include the distance of a router (round-trip time), data throughput of a link, or link availability and reliability, expressed as simple unit-less numbers. This provides a dynamic process of traffic load balancing between routes of equal cost. Further, an OSPF network can be structured, or subdivided, into routing areas to simplify administration and optimize traffic and resource utilization. Areas are identified by 32-bit numbers, expressed either simply in decimal, or often in octet-based dot-decimal notation, similar to that as IPv4 address notation.

Thus, using RIP and/or OSPF, Router A 404a can determine the shortest path from a first device that might be associated with network 1 404d to send a first message from the first device to a second device associated with network A 402a through Router B 404b. Accordingly, as OSPF changes and publishes network addresses, router b detects if someone puts a new network on it and publishes a list to all of the routers attached to it, including Router A and B 404a,b. Router A 404a can then make sure that no existing network attached to it (networks 1, 2, and 3 402d-f), or any new network that will become attached to it, conflicts with the network addresses that were published by the OSPF protocol to the interconnected routers. According to further aspects of the embodiment, similar operations occur when using RIP messages.

In this manner, according to aspects of the embodiments, use of RIP/OPSF messages ensures that there are no conflicts on the side of DHCP router 350/new network detection firmware 354. New network detection firmware 354/DHCP router 350 can further detect new networks connected to neighboring routers (i.e., routers connected to routers . . . ). Router A 404a can only change the addresses of those devices that are connected below it—nothing that is connected to Router B or C 404b,c.

According to further aspects of the embodiments, DHCP server 350 will be supplied with a sub-net of address space (subnet mask): 192.X.-192.X+5. This correlates to known address space as attached to Router A 404a. If a new network is attached, the master list of addresses kept at Router A 404a will be checked, and if there is an overlap, then Router A 404a will re-assign those addresses that are in conflict. The process of changing IP addresses of networks and network components is relatively straightforward to those of skill in the art. Thus, in fulfillment of the dual purposes of clarity and brevity, a detailed discussion thereof has been omitted from the discussion herein. As those of skill in the art can appreciate, changing IP addresses, once it is determined that it needs to be done in accordance with the different aspects of the embodiments, is relatively straightforward. For example, router A 404a, once it is determined that it and its network components need to change IP addresses, will reconfigure itself using known, self-contained routines (e.g., programs, or applications), such that its interface card has a new IP address, and then it will assign its network a new range of IP addresses. However, the network devices will not yet be aware of the change of IP addresses that have to be made; according to further aspects of the embodiments, the clients that are attached to router A 404a will "check in" about every half hour or so to verify its address. Once the client checks in, its new IP address can be safely and securely assigned to it. According to further aspects of the embodiments, such a process with about a 30 minute "blind" window provides security in that the outside network is protected as the mis-configured clients [of router A 404a] have no path to get to the outside network at any time.

Dynamic IP address manager/DHCP firmware 354, located within DHCP server 350, seeks EN 100 IP addresses, collects and compiles one or more lists or tables, and then generates new IP addresses for new network devices 304 that do not conflict with the IP addresses of existing network devices 104. As those of skill in the art can appreciate, prior to assigning non-conflicting IP addresses to new network devices 304, dynamic IP address manager/DHCP firmware 354, discussed below in regard to method 500, first compares the IP addresses that have already been assigned to new network devices 304 i.e., the ones that they may have been pre-programmed with prior to leaving their factory of origin; if there are no conflicts, then no re-assignment needs to take place. In essence, dynamic IP address manager/DHCP firmware 354 places a higher priority on IP addresses of existing network devices 104 of EN 100, and modifies the IP addresses of any newly added devices to avoid conflicts. As those of skill in the art can appreciate, the new network or existing network devices 304, 104 can also include servers/root nodes, among other types of devices.

In addition, the systems, methods and modes of the different aspects of the embodiments, i.e., the interaction between dynamic IP address manager/DHCP firmware 354, as embodied within method 500, can avoid IP address conflicts regardless of what type of network comprises EN 100 and new network 300. That is, any of the network topologies as shown and described with respect to FIG. 2 can be EN 100 and new network 300 according to an embodiment.

While it can be useful to implement the systems, methods, and modes of the aspects of the embodiments as shown and discussed in regard to FIG. 3, those of skill in the art can appreciate that it is rarely the case that the network structure of any organization remains static for very long. Indeed, it is much more often the case that entities grow, albeit slowly, but over a period of time most do, and they add new people, devices, and other things that will require adding to, or supplementing the existing network 100 as it was defined at the time the aspects of the embodiments was added as shown in FIG. 3. Thus, FIG. 4 illustrates DHCP server 352 of FIG. 3 according to a further embodiment that can further dynamically assign IP addresses to new networks and their new devices regardless of what kind and where the new network and its respective devices have been added to the existing network according to an embodiment.

As those of skill in the art can further appreciate, the delineation between what is "existing" and what is new could be perceived as being arbitrary, and to a certain extent that can be the case. However, for the purposes of this discussion, according to an embodiment, it can be considered that "existing" refers to those network(s) that exist or have been added to the left of line A, which represents anything to the left of router 352 within DHCP server 352. According to a further aspect of the embodiments, however, existing can also refer to those devices or networks that (a) were in existence at the time of implementation of DHCP server 350 and new network 300, (b) relate to one or more core business function of the enterprise (presuming that DHCP server 352 and new network 300 is being implemented into a business; the same can readily apply to educational or government entities), and (c) have been added and assigned previously un-assigned IP addresses according to the systems, methods and modes of the different aspects of the embodiments described herein. Of course, other definitions can be used as well, and are discussed below. For example, in the most general sense, "existing" can simply mean the preferred or higher priority network(s) and/or devices, or simply the ones that will take precedence over anything else that is added on afterwards. According to a further aspect of the embodiments, such designation can occur as part of implementation of DHCP server 352 and new network 300 and is further illustrated as part of method 500.

Referring now to FIG. 5, several different scenarios are illustrated for adding new networks as either "existing" networks, or "new" networks; the different being, as discussed above, as to which gets IP address prioritization.

According to an embodiment, any type of network as illustrated in FIG. 2 can be added and designated "new" or "existing."

According to an embodiment, a second EN 100b can be added to first EN 100a that includes existing network devices 104b interconnected to second EN server 102b via wired/wireless connections 103b. Second EN 100b can be connected via wire/wireless interconnection 105a, i.e., directly to first EN server 102a, or to DHCP server 352 by wired/wireless network interconnection 356b. By virtue of the placement of second EN 100b being placed where it is in FIG. 5, this indicates that second EN 100b is considered an "existing" or higher IP addressing priority network that those shown in the right side of dashed line A (those of skill in the art can appreciate that the terms "right" or "left" are not literal physical placements of a new network; such terms are merely used in regard to the drawing Figure to delineate a classification of a new network). Regardless of how second EN 100b is connected to existing networks, DHCP server 352 and new network detection firmware 354 substantially and continuously searched for new devices and networks by seeking "advertisements," or RIP or OSPF messages that indicate attachment of new networks and/or devices, as described above, and below in regard to FIG. 6, and method 600. Once DHCP server 352 and new network detection firmware 354 determines that any new networks/devices have been added, it seeks information as to whether the new devices or networks take IP addressing prioritization (i.e., is it characterized as an "existing/high priority" or "new" network/devices), or are lower priority "new" networks/devices. Once that determination is made, IP addresses can then be assigned or re-assigned as the case might be. In the scenario involving second existing network 100b, because it has been designated "existing" its IP addresses will be checked first against any other already existing IP addresses, and if there are conflicts, the IP addresses of second existing network 100b will be changed as necessary. An identical situation would occur if new existing network/devices 100n/104n were added, and attached to existing network devices 104a.

If, however, new devices or networks were added that connected to the right of router 352 as indicated in FIG. 5 (meaning that the new networks have a lower priority), then the system, methods, and modes of the aspects of the embodiments will only assign unused IP addresses to the new networks and/or devices. That is, the system, methods, and modes of the aspects of the embodiments considers anything connected to the right of router 352 as being of lower IP address priority, and will assign unused IP addresses to the new devices/servers. Thus, if second new network 300b were added and connected either directly to router 352 via DHCP server wired/wireless interconnection 356c, or connected to first new server/root node 302a via new network wired/wireless interconnection 303c, any IP addresses that might have already been assigned will be compared to the new list of existing IP addresses, and any changes will be made to the IP addresses of new server 302b and new devices 304b, as needed. A similar situation will occur if new network server/devices 300n/304n were added to one or more already present "new" devices 304a (e.g., suppose a new network printer was attached to an existing personal computer (PC), it could be added as shown as part of new devices 304n and its IP address would be assigned after checking the list of existing IP addresses).

FIG. 6 illustrates a flow chart of method 600 for integrating new networks 300 and respective devices 304 with one or more existing networks 100 (and respective devices 104) according to an embodiment. Method 600 begins with step 602 wherein DHCP server 350 creates an IP address list of all existing networks 100 and respective devices 104; these existing IP addresses are, by default, characterized as high-priority IP addresses, and an appropriate list or table can be constructed therefrom. Next, in decision step 604, DHCP server 350 and new network detection firmware 354 substantially continuously monitors network IP communications for advertisements by other attached routers that indicate whether new networks and/or devices have been attached to the existing network configuration/system. As described above, advertisements can include RIP and/or OSPF messages that indicate the attachment of new devices and/or networks, along with their respective IP addresses, as described above, which as those of skill in the art can appreciate, gives their locations so that new messages can be properly and efficiently routed to them. According to further aspects of the embodiments, DHCP server 350 and new network detection firmware 354 can also monitor, in decision step 604, for different types of messages that can indicate the presence of new networks and/or devices and their respective addresses.

If no advertisements are determined to be received in decision step 604, method 600 reverts back to step 604 and monitors for their presence ("No" path from decision step 604); if an advertisement is received ("Yes" path from decision step 604), DHCP server 350 and new network detection firmware 354 determine the IP addresses of the new network and/or device. As described above, DHCP server 350 includes router 352 and new network detection firmware 354 that can determine the new IP addresses of new devices 304 and new network 300 in method step 606. As discussed above, according to an embodiment, if the new network(s)/device(s) 300/304 are located to the right of router 352, i.e., placed in connection to router 352 (whether directly, as new network server/root node 302a has been (see, FIG. 4), or indirectly, as new network server/root node 302b can be (see, interconnection 303c, in FIG. 4)), then such items are by default designated "low-priority" IP address items. The designation of priority of IP addresses take place in method step 608 according to an embodiment.

In method step 610, method 600 begins the "resolving" process; that is, method 600 first resolves any conflicts between existing high-priority addresses and new high-priority IP addresses (for the new networks/devices 300/304 that could have just been added). A new high-priority IP address list or table is then generated by method 600 and stored in memory of DHCP server 350, the physical structure of which is described in greater detail below. According to an embodiment, the "resolving" occurs by way of a comparing of new high-priority IP addresses with existing high-priority IP addresses, and re-assigning IP addresses of new devices with the high-priority IP address designation if there is a conflict, and then creating a new high-priority IP address list.

In method step 612, method 600 then resolves any conflicts between the newly added network/devices 300/304 with low-priority IP addresses and the IP addresses that are part of the high-priority IP address table or list and existing devices with a low-priority IP address designation. According to an embodiment, the "resolving" occurs by way of a comparing of new low-priority IP addresses with existing low-priority IP addresses and existing high-priority IP addresses, and re-assigning IP addresses of new devices with the low-priority IP address designation if there is a conflict.

Following the resolution and re-assignment (if necessary) of IP addresses, method 600 then proceeds to step 614 wherein a monitoring process occurs to determine if a new network/device 300/304 has been added. If no new network/device 300/304 has been added ("No" path from decision step 614), then method continues to step 616, and continues to monitor for new items. If, however, one or more new networks/devices have been added ("Yes" path from decision step 614), then method 600 proceeds to step 606, wherein IP addresses of the new networks/devices 300/304 are obtained, and the process repeats.

According to an embodiment, it is possible to "over-ride" the presumption of networks/devices that have been added and connected to router 352 as being low-priority IP address items. For example, if a new security apparatus were to be added, it could be given a high-priority IP address because outside vendors need to access the same, and it is simply easier not to have to change the IP address based on the logistics the outside vendor changing their communication protocols and programming.

According to a further embodiment, the process of designating whether a new network/device 300/304 is a high-priority IP address device or low-priority IP address device can be determined solely on where the new network/device 300/304 is connected to the existing network system (i.e., as discussed above, whether the new network/device 300/304 is connected directly to (or to the right side of) router 354), or it can be determined based on a type of device/network, and this can be done automatically or manually, and there can be other means for determining IP address prioritization.

FIG. 7 illustrates a PC/laptop/PC (herein after, "PC") 700 suitable for use to implement method 600 for method 600 for integrating new networks 300 and respective devices 304 with one or more existing networks 100 (and respective devices 104) according to an embodiment. PC 700 comprises, among other items, shell/box 701, integrated display/touch-screen 702 (though not used in every application of PC 700), internal data/command bus (bus) 704, processor board/PC internal memory (internal memory) 732, and one or more processors 708 with processor internal memory 706 (which can be typically read only memory (ROM) and/or random access memory (RAM)). Those of ordinary skill in the art can appreciate that in modern PC systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application. PC 700 further comprises multiple input/output ports, such as universal serial bus ports 710, Ethernet ports 711, and video graphics array (VGA) ports/high definition multimedia interface (HDMI) ports 722, among other types. Further, PC 700 includes externally accessible drives such as compact disk (CD)/digital video disk (DVD) read/write (RW) (CD/DVD/RW) drive 712, and floppy diskette drive 714 (though less used currently, many PCs still include this device). PC 700 still further includes wireless communication apparatus, such as one or more of the following: Wi-Fi transceiver 742, BlueTooth (BT) transceiver 744, near field communications (NFC) transceiver 746, third generation (3G)/fourth Generation (4G)/long term evolution (LTE) (3G/4G/LTE) transceiver 748, communications satellite/global positioning system (satellite) transceiver device 750, and antenna 752.

Internal memory 732 itself can comprise hard disk drive (HDD) 716 (these can include conventional magnetic storage media, but, as is becoming increasingly more prevalent, can include flash drive memory 734, among other types), read-only memory (ROM) 718 (these can include electrically erasable (EE) programmable ROM (EEPROMs), ultraviolet erasable PROMs (UVPROMs), among other types), and random access memory (RAM) 720. Usable with USB port 710 is flash drive memory 734, and usable with CD/DVD/RW drive 712 are CD/DVD disks 736 (which can be both read and write-able). Usable with floppy diskette drive 714 are floppy diskettes 738. External memory storage 724 can be used to store data and programs external to box 701 of PC 700, and can itself comprise another hard disk drive 716a, flash drive memory 734, among other types of memory storage. External memory storage 724 is connectable to PC 700 via USB cable 756. Each of the memory storage devices, or the memory storage media (706, 716, 718, 720, 724, 734, 736, and 738, among others), can contain parts or components, or in its entirety, executable software programming code or application (application, or "App") 740, which can implement part or all of the portions of method XYZ described herein.

In addition to the above described components, PC 700 also comprises keyboard 728, external display 726, printer/scanner/fax machine 760, and mouse 730 (although not technically part of PC 700, the peripheral components as shown in FIG. 7 (722, 724, 726, 728, 730, 734, 736, 738, 756, 758, and 760) are so well known and adapted for use with PC 700 that for purposes of this discussion they shall be considered as being part of PC 700). Other cable types that can be used with PC 700 include RS 232, among others, not shown, that can be used for one or more of the connections between PC 700 and the peripheral components described herein. Keyboard 728, mouse 730, and printer/scanner/fax machine 760 are connectable to PC 700 via USB cable 56, and external display 726 is connectible to PC 700 via VGA cable/HDMI cable 722. PC 700 is connectible to internet 754 via Ethernet port 711 and Ethernet cable 758 via a router and modulator-demodulator (MODEM), neither of which are shown in FIG. 7. All of the immediately aforementioned components (722, 724, 726, 728, 730, 734, 736, 738, 756, 758, and 760) are known to those of ordinary skill in the art, and this description includes all known and future variants of these types of devices.

External display 726 can be any type of known display or presentation screen, such as liquid crystal displays (LCDs), light emitting diode displays (LEDs), plasma displays, cathode ray tubes (CRTs), among others. In addition to the user interface mechanism such as mouse 730, PC 700 can further include a microphone, touch pad, joy stick, touch screen, voice-recognition system, among other inter-active inter-communicative devices/programs, which can be used to enter data and voice, and which all of are known to those of skill in the art and thus a detailed discussion thereof has been omitted in fulfillment of the dual purposes of clarity and brevity.

As mentioned above, PC 700 further comprises a plurality of wireless transceiver devices, such as Wi-Fi transceiver 742, BT transceiver 744, NFC transceiver 746, 3G/4G/LTE transceiver 748, satellite transceiver device 750, and antenna 752. While each of Wi-Fi transceiver 742, BT transceiver 744, NFC transceiver 746, 3G/4G/LTE transceiver 748, and satellite transceiver device 750 has their own specialized functions, each can also be used for other types of communications, such as accessing a cellular service provider (not shown), accessing internet 754, texting, emailing, among other types communications and data/voice transfers/exchanges, as known to those of skill in the art. Each of Wi-Fi transceiver 742, BT transceiver 744, NFC transceiver 746, 3G/4G/LTE transceiver 748, satellite transceiver device 750 includes a transmitting and receiving device, and a specialized antenna, although in some instances, one antenna can be shared by one or more of Wi-Fi transceiver 742, BT transceiver 744, NFC transceiver 746, 3G/4G/LTE transceiver 748, and satellite transceiver device 750. Alternatively, one or more of Wi-Fi transceiver 742, BT transceiver 744, NFC transceiver 746, 3G/4G/LTE transceiver 748, and satellite transceiver device 750 will have a specialized antenna, such as satellite transceiver device 750 to which is electrically connected at least one antenna 752.

In addition, PC 700 can access internet 754, either through a hard wired connection such as Ethernet port 711 as described above, or wirelessly via Wi-Fi transceiver 742, 3G/4G/LTE transceiver 748 and/or satellite transceiver 750 (and their respective antennas) according to an embodiment. PC 700 can also be part of a larger network configuration as in a global area network (GAN) (e.g., internet 754), which ultimately allows connection to various landlines.

According to further embodiments, integrated touch screen display 702, keyboard 728, mouse 730, and external display 726 (if in the form of a touch screen), can provide a means for a user to enter commands, data, digital, and analog information into PC 700. Integrated and external displays 702, 726 can be used to show visual representations of acquired data, and the status of applications that can be running, among other things.

Bus 704 provides a data/command pathway for items such as: the transfer and storage of data/commands between processor 708, Wi-Fi transceiver 742, BT transceiver 744, NFC transceiver 746, 3G/4G/LTE transceiver 748, satellite transceiver device 750, integrated display 702, USB port 710, Ethernet port 711, VGA/HDMI port 722, CD/DVD/RW drive 712, floppy diskette drive 714, and internal memory 732. Through bus 704, data can be accessed that is stored in internal memory 732. Processor 708 can send information for visual display to either or both of integrated and external displays 702, 726, and the user can send commands to system operating programs/software/Apps 740 that might reside in processor internal memory 706 of processor 708, or any of the other memory devices (736, 738, 716, 718, and 720).

PC 700, and either processor internal memory 706 or internal memory 732, can be used to implement method 700 for method 600 for integrating new networks 300 and respective devices 304 with one or more existing networks 100 and respective devices 104 according to an embodiment. Hardware, firmware, software or a combination thereof may be used to perform the various steps and operations described herein. According to an embodiment, App 740 for carrying out the above discussed steps can be stored and distributed on multi-media storage devices such as devices 716, 718, 720, 734, 736 and/or 738 (described above) or other form of media capable of portably storing information. Storage media 734, 736 and/or 738 can be inserted into, and read by devices such as USB port 710, CD/DVD/RW drive 712, and disk drives 714, respectively.

As also will be appreciated by one skilled in the art, the various functional aspects of the embodiments may be embodied in a wireless communication device, a telecommunication network, or as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

The disclosed embodiments provide a system and method for integrating new networks 300 and respective devices 304 with one or more existing networks 100 and respective devices 104. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

DHCP server 350, and either memory 706 or memory 732, can be used to implement method 600 for integrating new networks and respective devices with one or more existing networks according to an embodiment. Hardware, firmware, software or a combination thereof may be used to perform the various steps and operations described herein. According to an embodiment, App 740 for carrying out the above discussed steps can be stored and distributed on multi-media storage devices such as devices 716, 718, 720, 734, 736 and/or 738 (described above) or other form of media capable of portably storing information, and storage media 734, 736 and/or 738 can be inserted into, and read by, devices such as USB port 710, CD-ROM drive 712, and disk drives 714, 716, among other types of software storage devices.

As also will be appreciated by one skilled in the art, the various functional aspects of the embodiments may be embodied in a wireless communication device, a telecommunication network, or as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and non-volatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

The disclosed embodiments provide systems, methods, and modes for preventing internet protocol (IP) address conflicts when installing or integrating new networks with existing networks. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

INDUSTRIAL APPLICABILITY

To solve the aforementioned problems, the aspects of the embodiments are directed towards systems, methods, and modes for preventing internet protocol (IP) address conflicts when installing or integrating new networks with existing networks.

The disclosed embodiments provide a system, software, and a method for assigning IP addresses for new devices and networks attached to an existing network and devices without conflicts between the newly assigned and existing set of IP addresses, as well as determining and distinguishing assignment of IP addresses based on a prioritization level given to the new and existing devices and networks. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments.

What is claimed is:

1. A method for assigning new internet protocol (IP) addresses to new network devices in an existing computer network, comprising:
    assigning respective new IP addresses to one or more new network devices by a first computer server based on one or more communications received by the first computer server, wherein the one or more communications comprise advertisement messages that include information about the one or more new network devices, and wherein the step of assigning comprises:
        determining an existing set of IP addresses for existing network devices, and
        assigning respective previously un-assigned IP addresses to the one or more new network devices, and further wherein the step of assigning respective previously un-assigned IP addresses comprises:
            determining if there are any conflicts between IP addresses of existing network devices of the existing network and IP addresses of the new network devices, and resolving conflicts between the existing IP addresses and new IP addresses in favor of the existing IP addresses and assigning previously un-assigned IP addresses to the new network devices.

2. The method according to claim 1, wherein the advertisement comprises:
a message received from a device that uses either or both of router internet protocol (RIP) and open shortest path first protocol (OSPF) messages to publish information regarding the one or more new network devices being added to the existing network.

3. The method according to claim 1, wherein the one or more new network devices comprise:
one or more of a router, server, printer, computer, a facsimile machine, a scanner, network switch, and any other network compatible device.

4. The method according to claim 1, wherein the first device comprises a router.

5. The method according to claim 1 wherein the steps are performed substantially continuously so that new network devices and their respective IP addresses can be detected and resolved substantially continuously.

6. A method for assigning new IP addresses to new network devices in an existing network, comprising:
(a) determining an existing set of IP addresses for existing network devices;
(b) determining which of the existing set of IP addresses are designated with a high-priority IP address designation and which are designated with a low-priority IP address designation;
(c) connecting one or more new network devices to the existing network;
(d) determining a new set of IP addresses for one or more new network devices connected to the existing network;
(e) determining which of the new set of IP addresses are designated with a high-priority IP address designation and which are designated with a low-priority IP address designation;
(f) comparing new high-priority IP addresses with existing high-priority IP addresses and re-assigning IP addresses of the new network devices with the high-priority IP address designation if there is a conflict, and creating a new high-priority IP address list;
(g) comparing new low-priority IP addresses with both existing low-priority IP addresses and high-priority IP address list, and re-assigning IP addresses of the new network devices with the low-priority IP address designation if there is a conflict; and
(h) continuing to monitor the network for new network devices, and repeating the steps of (d) through (g) whenever new network devices are added to the network.

7. A computer network system (network system), comprising:
a first hardware computer server in the network system adapted to assign respective new internet protocol (IP) addresses to one or more new network devices based on one or more communications received by the first hardware computer server, wherein the one or more communications comprise advertisement messages that include information about the one or more new network devices, and wherein the first hardware computer server is further adapted to determine an existing set of IP addresses for existing network devices, and to assign respective previously un-assigned IP addresses to the one or more new network devices, and further wherein the first hardware computer server is further adapted
to determine an existing set of IP addresses for existing network devices, and
to assign respective previously un-assigned IP addresses to the one or more new network devices, and
further wherein the first hardware computer server is further adapted
to determine if there are any conflicts between IP addresses of existing network devices of the existing network and IP addresses of the new network devices, and
to resolve conflicts between the existing IP addresses and new IP addresses in favor of the existing IP addresses and to assign previously un-assigned IP addresses to the new network devices.

8. The network system according to claim 7, wherein the advertisement message comprises:
a message received from the new network device that uses either or both of router internet protocol (RIP) and open shortest path first protocol (OSFP) messages to publish information regarding the one or more new network devices being added to the existing network.

9. The network system according to claim 7, wherein the one or more new network devices comprise:
one or more of a router, server, printer, computer, a facsimile machine, a scanner, network switch, and any other network compatible device.

10. The network system according to claim 7, wherein the first hardware computer server comprises a router.

11. The network system according to claim 7, wherein
the first server is further adapted to resolve conflicts substantially continuously so that new network devices and their respective IP addresses can be detected and resolved substantially continuously.

12. A method for assigning new internet protocol (IP) addresses to new network devices in an existing computer network, comprising:
assigning respective new IP addresses to one or more new network devices by a first computer server based on one or more communications received by the first computer server, wherein the one or more communications comprise advertisement messages that include information about the one or more new network devices, and wherein the step of assigning comprises:
determining an existing set of IP addresses for existing network devices, and
assigning respective previously un-assigned IP addresses to the one or more new network devices, and further wherein the step of assigning respective previously un-assigned IP addresses comprises:
determining if there are any conflicts between IP addresses of existing network devices of the existing network and IP addresses of the new network devices,
determining a priority level of each of the existing network devices according to a multi-tiered prioritization scale,
determining a priority level of each of the new network devices according to a multi-tiered prioritization scale, and
resolving conflicts between conflicting IP addresses based on the prioritization scale, such that higher prioritization ranked network devices retain their IP addresses over lower prioritization network devices.

13. The method according to claim 12, wherein the advertisement comprises:

a message received from the new network device that uses either or both of router internet protocol (RIP) and open shortest path first protocol (OSPF) messages to publish information regarding the one or more new network devices being added to the existing network.

14. The method according to claim 12, wherein the one or more new network devices comprise:
one or more of a router, server, printer, computer, a facsimile machine, a scanner, network switch, and any other network compatible device.

15. The method according to claim 12, wherein the first computer server comprises a router.

16. The method according to claim 12, wherein
the steps are performed substantially continuously so that new network devices and their respective IP addresses can be detected and resolved substantially continuously.

17. A computer network system (network system), comprising:
a first hardware computer server in the network system adapted to assign respective new internet protocol (IP) addresses to one or more new network devices based on one or more communications received by the first hardware computer server, wherein the one or more communications comprise advertisement messages that include information about the one or more new network devices, and wherein the first hardware computer server is further adapted
to determine an existing set of IP addresses for existing network devices, and
to assign respective previously un-assigned IP addresses to the one or more new network devices, and wherein the first hardware computer server is further adapted to
determine if there are any conflicts between IP addresses of existing network devices of the existing network and IP addresses of the new network devices,
to further determine a priority level of each of the existing network devices according to a multi-tiered prioritization scale;
to further determine a priority level of each of the new network devices according to a multi-tiered prioritization scale, and
to still further resolve conflicts between conflicting IP addresses based on the prioritization scale, such that higher prioritization ranked network devices retain their IP addresses over lower prioritization network devices.

18. The network system according to claim 17, wherein the advertisement message comprises:
a message received from the new network device that uses either or both of router internet protocol (RIP) and open shortest path first protocol (OSFP) messages to publish information regarding the one or more new network devices being added to the existing network.

19. The network system according to claim 17, wherein the one or more new network devices comprise:
one or more of a router, server, printer, computer, a facsimile machine, a scanner, network switch, and any other network compatible device.

20. The network system according to claim 17, wherein the first hardware computer server comprises a router.

21. The network system according to claim 17, wherein the first hardware computer server is further adapted to resolve conflicts substantially continuously so that new network devices and their respective IP addresses can be detected and resolved substantially continuously.

* * * * *